(12) United States Patent  (10) Patent No.: US 8,091,843 B2
Tsai  (45) Date of Patent: Jan. 10, 2012

(54) VACUUM MOUNT TYPE SUPPORT DEVICE

(76) Inventor: Wen-Feng Tsai, Taipei (TW)

( * ) Notice: Subject to any disclaimer, the term of this patent is extended or adjusted under 35 U.S.C. 154(b) by 254 days.

(21) Appl. No.: 12/462,330

(22) Filed: Aug. 3, 2009

(65) Prior Publication Data

US 2011/0024587 A1   Feb. 3, 2011

(51) Int. Cl.
*A45D 42/14* (2006.01)
*F16B 47/00* (2006.01)
(52) U.S. Cl. ............... 248/206.2; 248/205.5; 248/309.3
(58) Field of Classification Search ............. 248/205.5, 248/205.6, 205.7, 205.8, 205.9, 206.1, 206.2, 248/206.3, 683, 362, 363, 292.12
See application file for complete search history.

(56) References Cited

U.S. PATENT DOCUMENTS

| | | | | |
|---|---|---|---|---|
| 1,877,570 A * | 9/1932 | Fitz Gerald | ........... | 211/69.7 |
| 5,495,884 A * | 3/1996 | Shikler | ........... | 160/120 |
| 5,961,078 A * | 10/1999 | Edberg et al. | ........... | 244/173.2 |
| 6,193,197 B1 * | 2/2001 | Lian | ........... | 248/206.2 |
| 7,007,908 B2 * | 3/2006 | Tsay | ........... | 248/309.3 |
| 7,021,593 B1 * | 4/2006 | Fan | ........... | 248/206.2 |
| 7,178,771 B2 * | 2/2007 | Richter | ........... | 248/205.8 |
| 7,241,069 B2 * | 7/2007 | Richter | ........... | 403/122 |
| 7,344,114 B2 * | 3/2008 | Richter | ........... | 248/205.5 |
| 7,387,284 B2 * | 6/2008 | Chang | ........... | 248/206.5 |
| 7,431,250 B2 * | 10/2008 | Chen | ........... | 248/205.5 |

* cited by examiner

*Primary Examiner* — Tan Le
(74) *Attorney, Agent, or Firm* — Jackson IPG PLLC; Demian K. Jackson

(57) ABSTRACT

A vacuum mount type support device includes a vacuum mount base member having a multilateral upright shaft, a hard vacuum mount cap member having a cup-like body capped on the top side of the rubber disk of the vacuum mount base member and a through hole for the passing of the multilateral upright shaft, a control device threaded onto the multilateral upright shaft and rotatably to impart a pressure to the vacuum mount cap member against the vacuum mount base member for causing formation of a vacuum suction force, and a device holder fastened to the connector of the vacuum mount base member above the control device for holding an external device.

6 Claims, 9 Drawing Sheets

VACUUM MOUNT TYPE SUPPORT DEVICE

BACKGROUND OF THE INVENTION

1. Field of the Invention

The present invention to a support device for holding an electronic apparatus or a rack and more particularly, to a vacuum mount type support device that can be fastened to a glass or smooth surface conveniently and positively by means of a vacuum suction force.

2. Description of the Related Art

A hanging support may be installed in a bathroom or inside a car for hanging towels or other things. Regular hanging supports are designed for mounting on a flat wall or planar glass panel, not suitable for installation in a corner area between two abutted walls. Therefore, the application range of conventional hanging supports is limited.

FIGS. 1~3 illustrate a vacuum mount type support device according to the prior art. According to this design, the vacuum mount type support device comprises a base member 1, a pressure member 2, a control member 7, a connector 8, a support arm 4, and a device holder 5. This structure of vacuum mount type support device has the drawbacks of complicated structure and high manufacturing cost. Further, it takes much time to assemble the whole assembly.

SUMMARY OF THE INVENTION

The present invention has been accomplished to provide a vacuum mount type support device, which eliminates the drawbacks of the prior art design. According to one embodiment of the present invention, the vacuum mount type support device comprises a vacuum mount base member, a vacuum mount cap member made of a hard material, a control device, a stop member, and a device holder. The vacuum mount base member comprises a multilateral upright shaft, and a rubber disk located on the bottom side of the multilateral upright shaft for attaching to a smooth surface for producing a vacuum suction force. The multilateral upright shaft has an outer thread extending around the periphery of the lower part thereof, and a connector located on the top end thereof. The vacuum mount cap member has a cup-like body capped on the top side of the rubber disk of the vacuum mount base member and a through hole cut through the center of the cup-like body for the passing of the multilateral upright shaft. The control device is threaded onto the multilateral upright shaft and rotatably to impart a pressure to the vacuum mount cap member against the vacuum mount base member. The stop member is fastened to the multilateral upright shaft to prohibit escape of the vacuum mount cap member from the multilateral upright shaft. The device holder is fastened to the connector of the vacuum mount base member above the control device for holding an external device.

In an alternate form of the present invention, the control device is a lever pivotally connected to the vacuum mount cap member and biasable relative to the vacuum mount cap member to impart a pressure to the vacuum mount cap member against the vacuum mount base member. The control device has two cam portions kept in contact with the top surface of the vacuum mount cap member.

DETAILED DESCRIPTION OF THE PREFERRED EMBODIMENT

Figure 1:
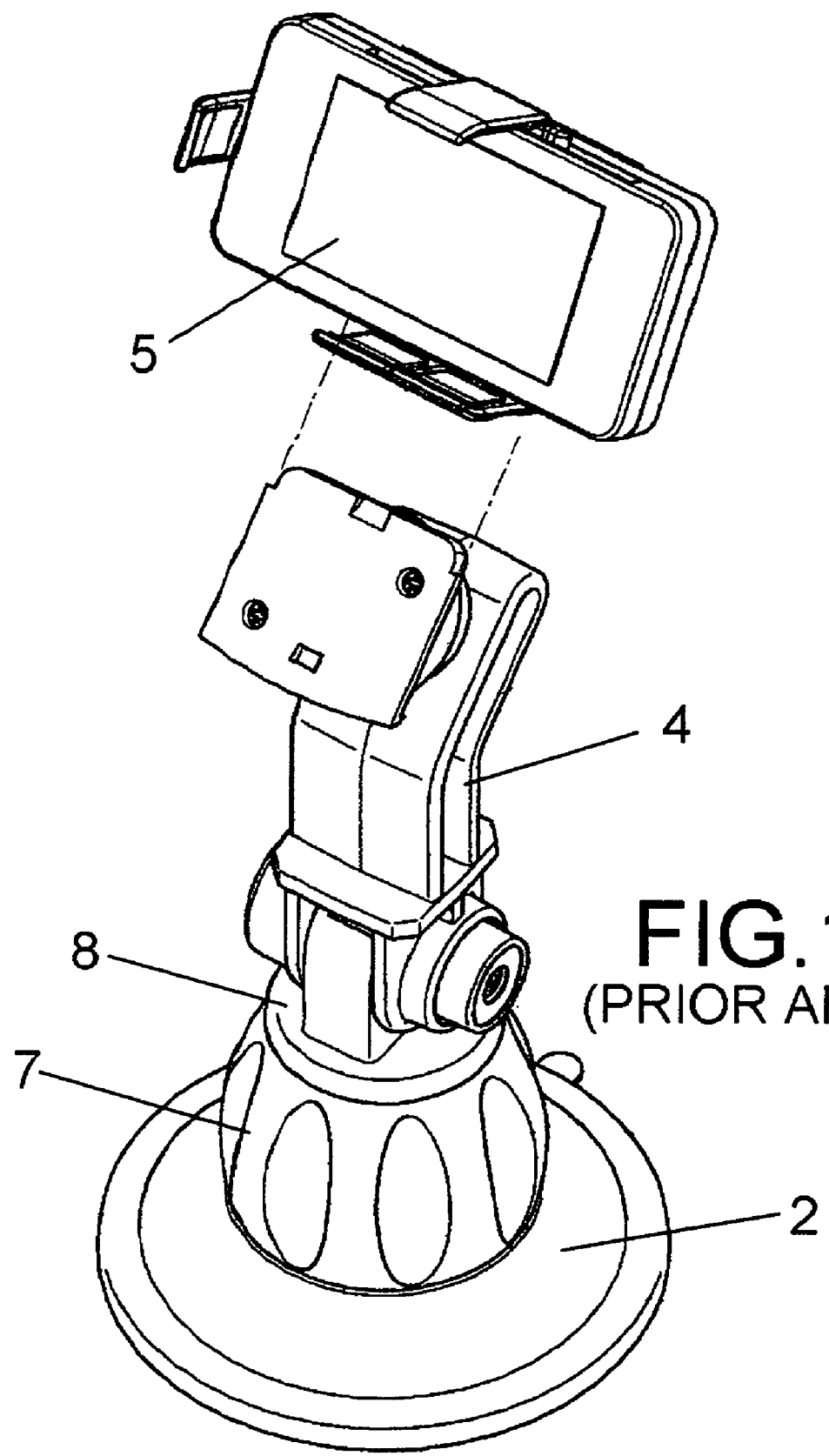
FIG. 1 is an elevational view of a vacuum mount type support device according to the prior art.
Figure 2:
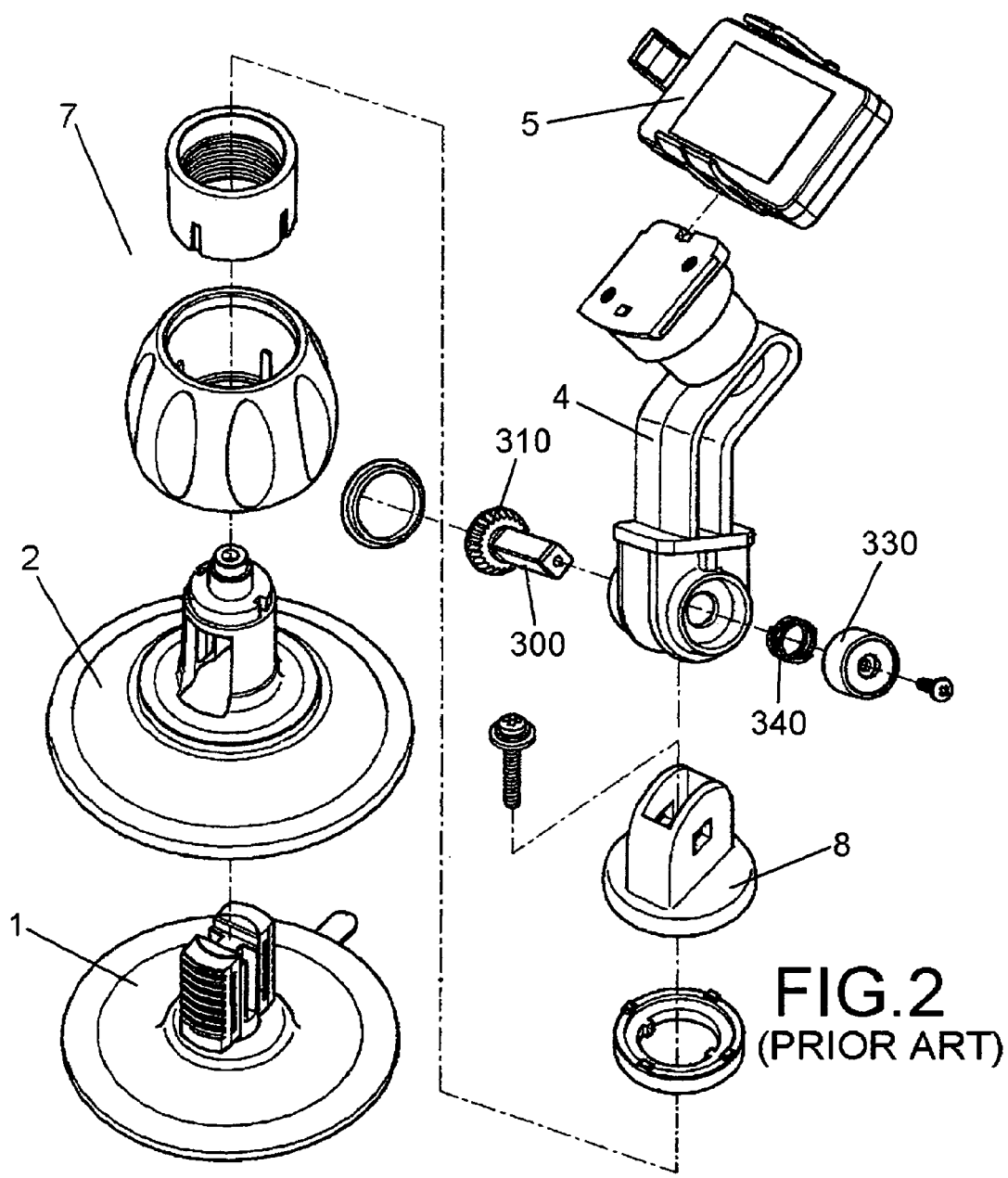
FIG. 2 is an exploded view of the vacuum mount type support device according to the prior art.
Figure 3:
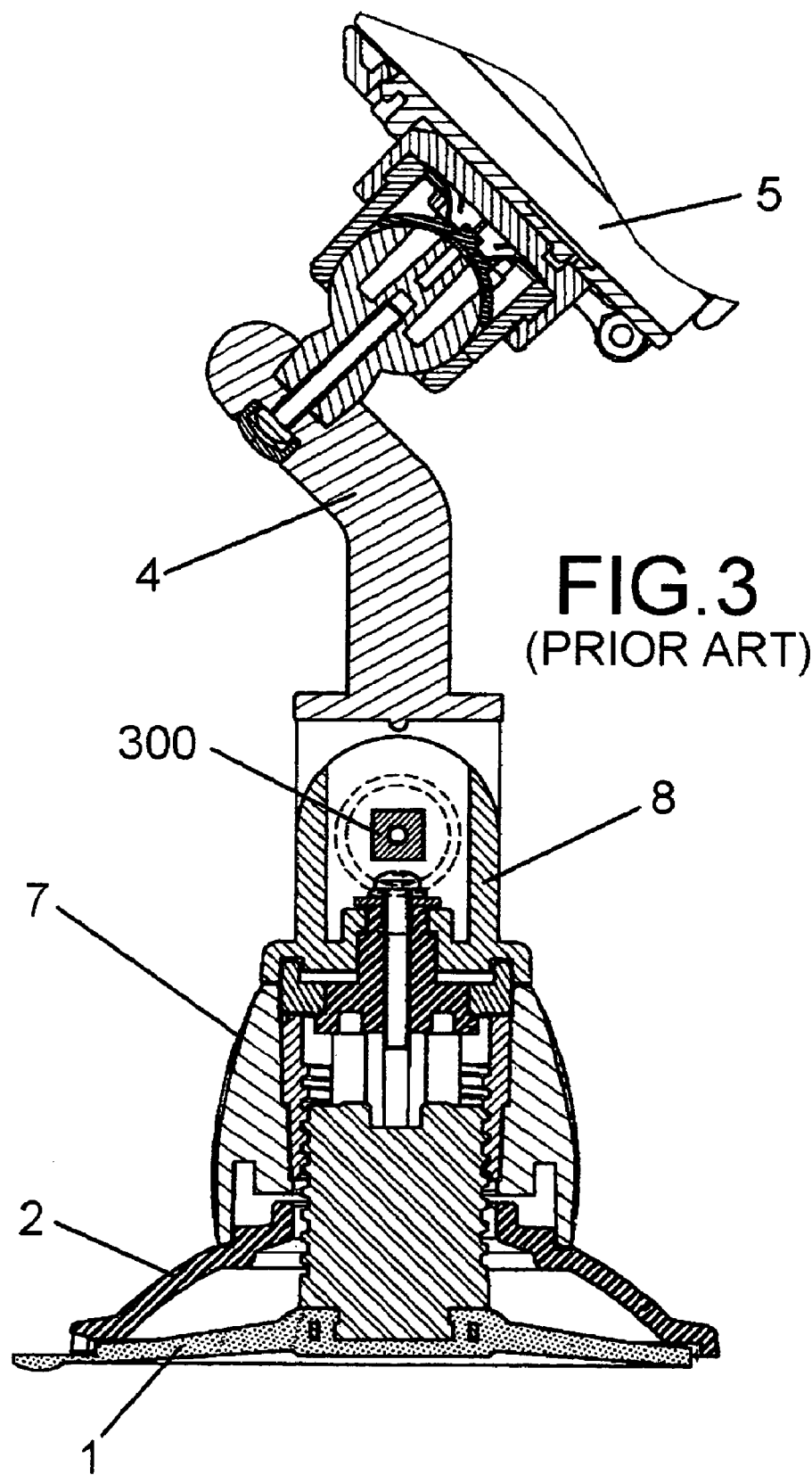
FIG. 3 is a sectional side view of the vacuum mount type support device according to the prior art.
Figure 4:
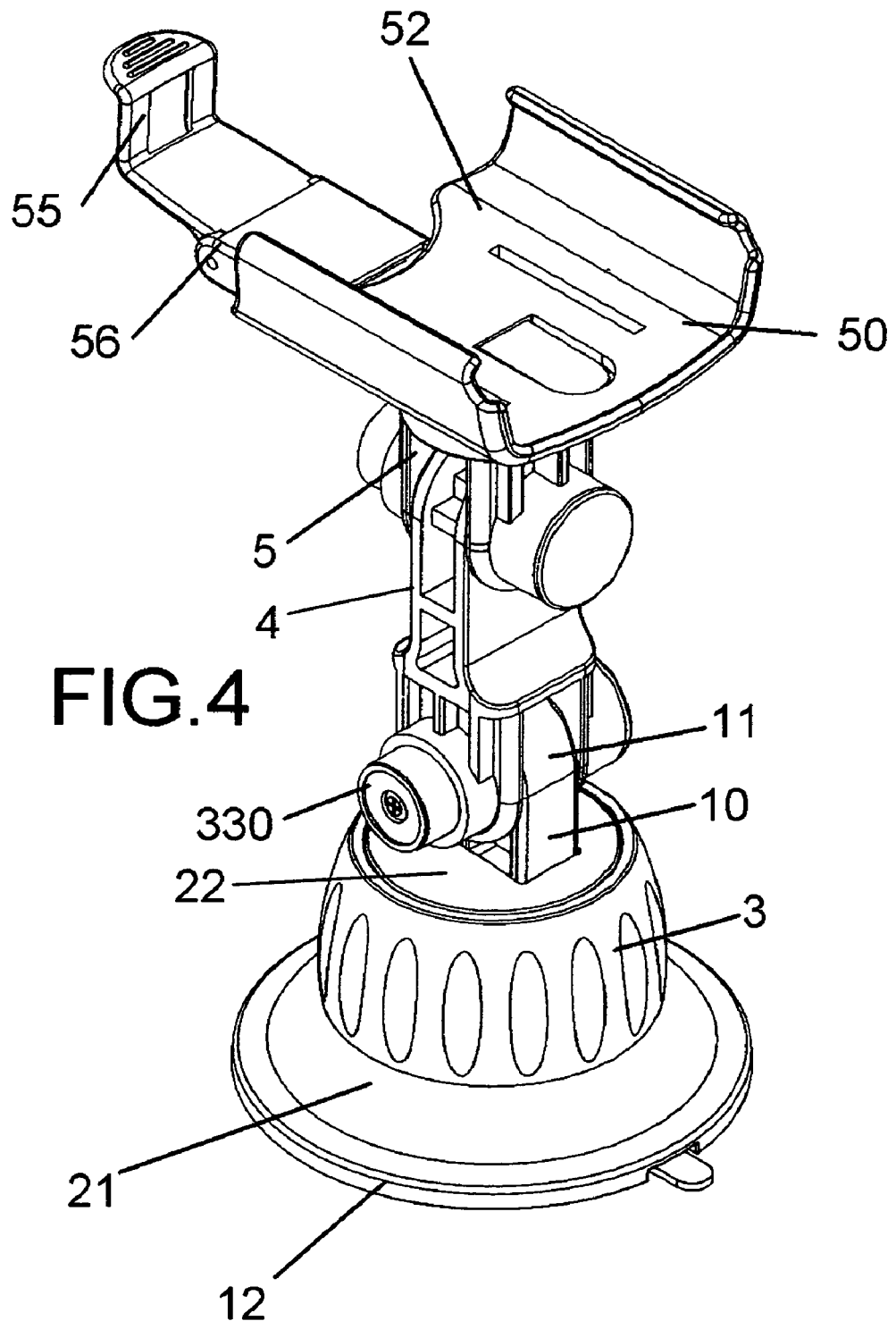
FIG. 4 is an elevational view of a vacuum mount type support device in accordance with a first embodiment of the present invention.
Figure 5:
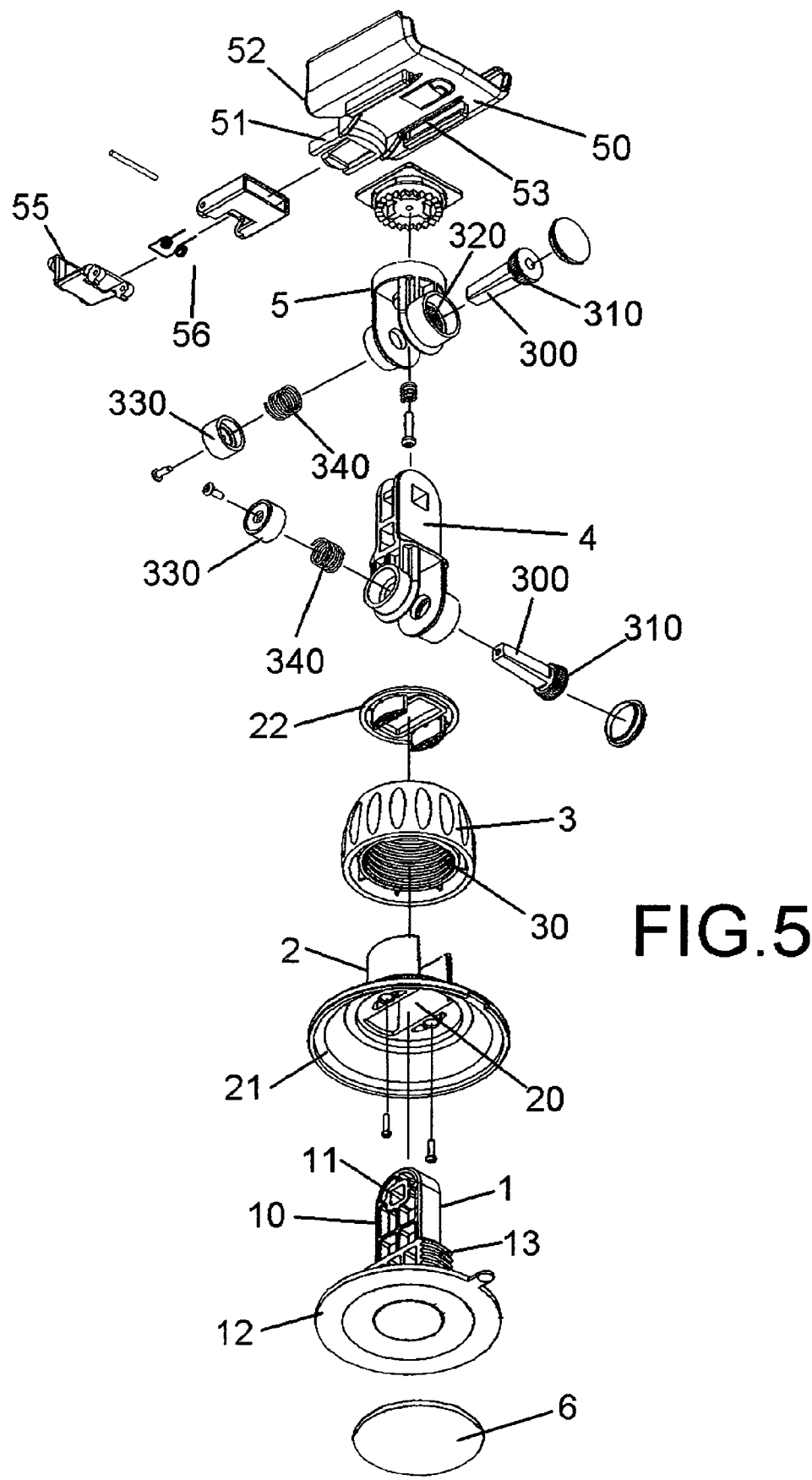
FIG. 5 is an exploded view of the vacuum mount type support device in accordance with the first embodiment of the present invention.
Figure 6:
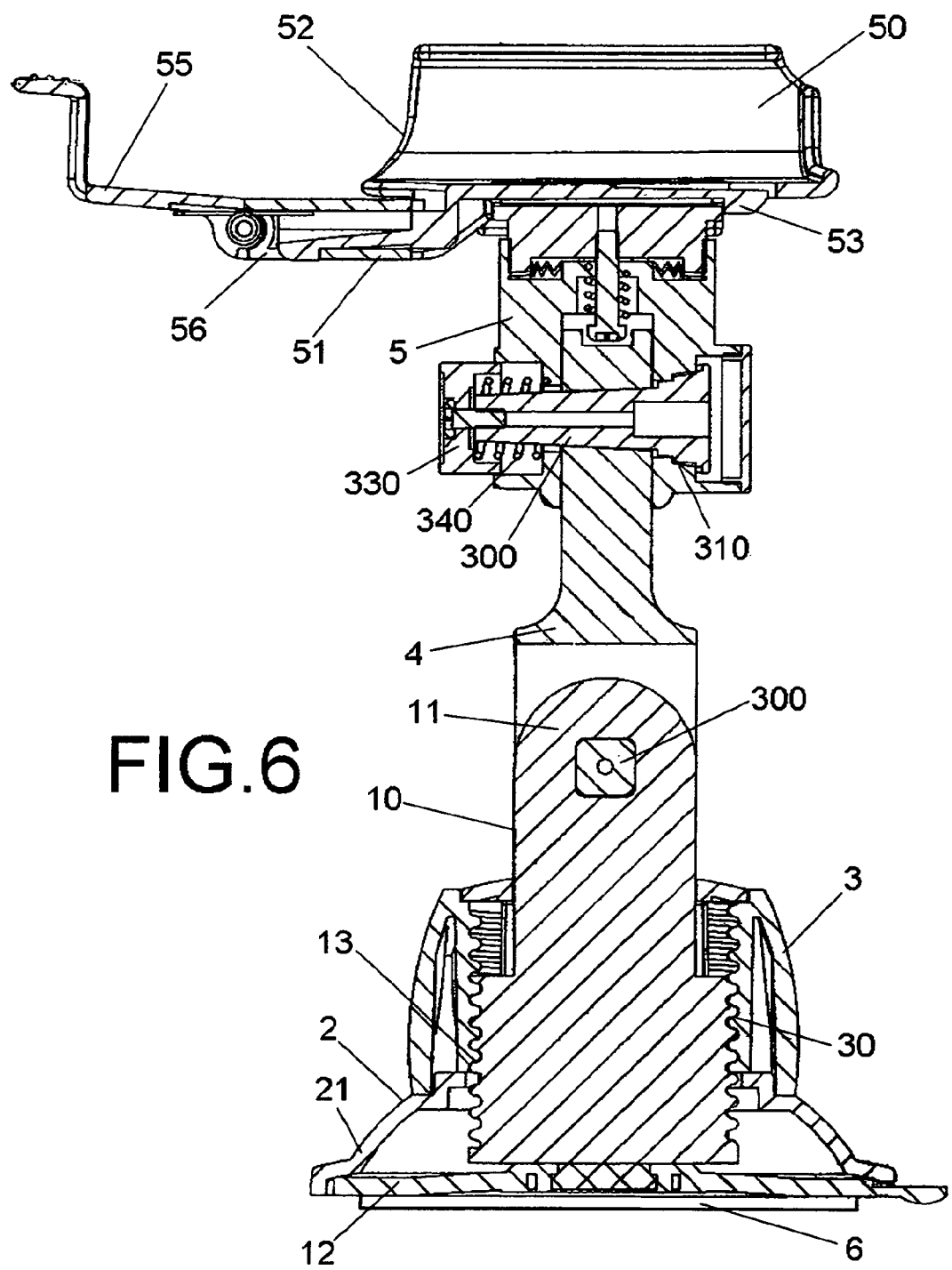
FIG. 6 is a sectional side view of the vacuum mount type support device in accordance with the first embodiment of the present invention.

Referring to FIGS. 4~6, a vacuum mount type support device in accordance with a first embodiment of the present invention is shown comprising a vacuum mount base member 1, a vacuum mount cap member 2, a control device 3, a first support arm 4, a second support arm 5, and a device holder 50.

The vacuum mount base member 1 has a multilateral upright shaft 10, and a rubber disk 12 located on the bottom side of the multilateral upright shaft 10. Further, a flat polyurethane pad 6 is bonded to the bottom side of the rubber disk 12. The multilateral upright shaft 10 has an outer thread 13 extending around the periphery of the lower part thereof, and a connector 11 located on the top end thereof. The vacuum mount cap member 2 is made of a hard material, having a cup-like body 21 capped on the top side of the rubber disk 12 of the vacuum mount base member 1 and a through hole 20 cut through the center of the cup-like body 21 for the passing of the multilateral upright shaft 10. The control device 3 is a hollow member sleeved onto the multilateral upright shaft 10 and stopped at the top side of the cup-like body 21, having an inner thread 30 threaded onto the outer thread 13 of the vacuum mount base member 1. Further, a stop member 22 is fastened to the multilateral upright shaft 10 to prohibit escape of the vacuum mount cap member 2 from the multilateral upright shaft 10.

The first support arm 4 has the bottom and top ends thereof respectively pivotally coupled to the connector 11 of the multilateral upright shaft 10 and the bottom end of the second support arm 5 by a connection structure, which comprises a first toothed portion 320 formed in the connector 11/bottom end of the second support arm 5, a bolt 300 inserted through the bottom end of the first support arm 4 and the connector 11/the bottom end of the second support arm 5 and the top end of the first support arm 4, a second toothed portion 310 located on one end of the bolt 300 and adapted for engaging the first toothed portion 320, a cap nut 330 threaded onto the other end of the bolt 300, and a compression spring 340 sleeved onto the bolt 300 and stopped between the cap nut 330 and the first support arm 4/second support arm 5.

The device holder 50 is adapted to hold an apparatus, rack, or the like, having a recessed holder base 52, a mounting portion 53 located on the bottom side of the recessed holder base 52 for fastening to the top end of the second support arm 5, an extension bar 51 extended from one side of the recessed holder base 52, a shell 56 fastened to the extension bar 51, and a clamping plate 55 inserted into the shell 56 and movable in and out of the shell 56 between a received position and an extended position and biasable relative to the shell 56 when extended out of the shell 56 to the extended position.

When the rubber disk 12 (the flat polyurethane pad 6) of the vacuum mount base member 1 is attached to a glass or any smooth surface, rotate the control device 3 in direction toward the rubber disk 12 to force the cup-like body 21 against the rubber disk 12, causing a vacuum to be produced in between the glass and the rubber disk 12. Thus, the vacuum mount type support device is fastened to the glass. Further, when press the cap nut 330 to move the respective bolt 300, the respective second toothed portion 310 is disengaged from the respective first toothed portion 320, allowing adjustment of the angle of the first support arm 4 relative to the multilateral upright shaft 10 of the vacuum mount base member 1 or the second support arm 5 relative to the first support arm 4. When released the hand from the cap nut 330, the second toothed portion 310 is returned into engagement with the first toothed portion 320 again subject to the effect of the spring force of the compression member 340.

Figure 7:
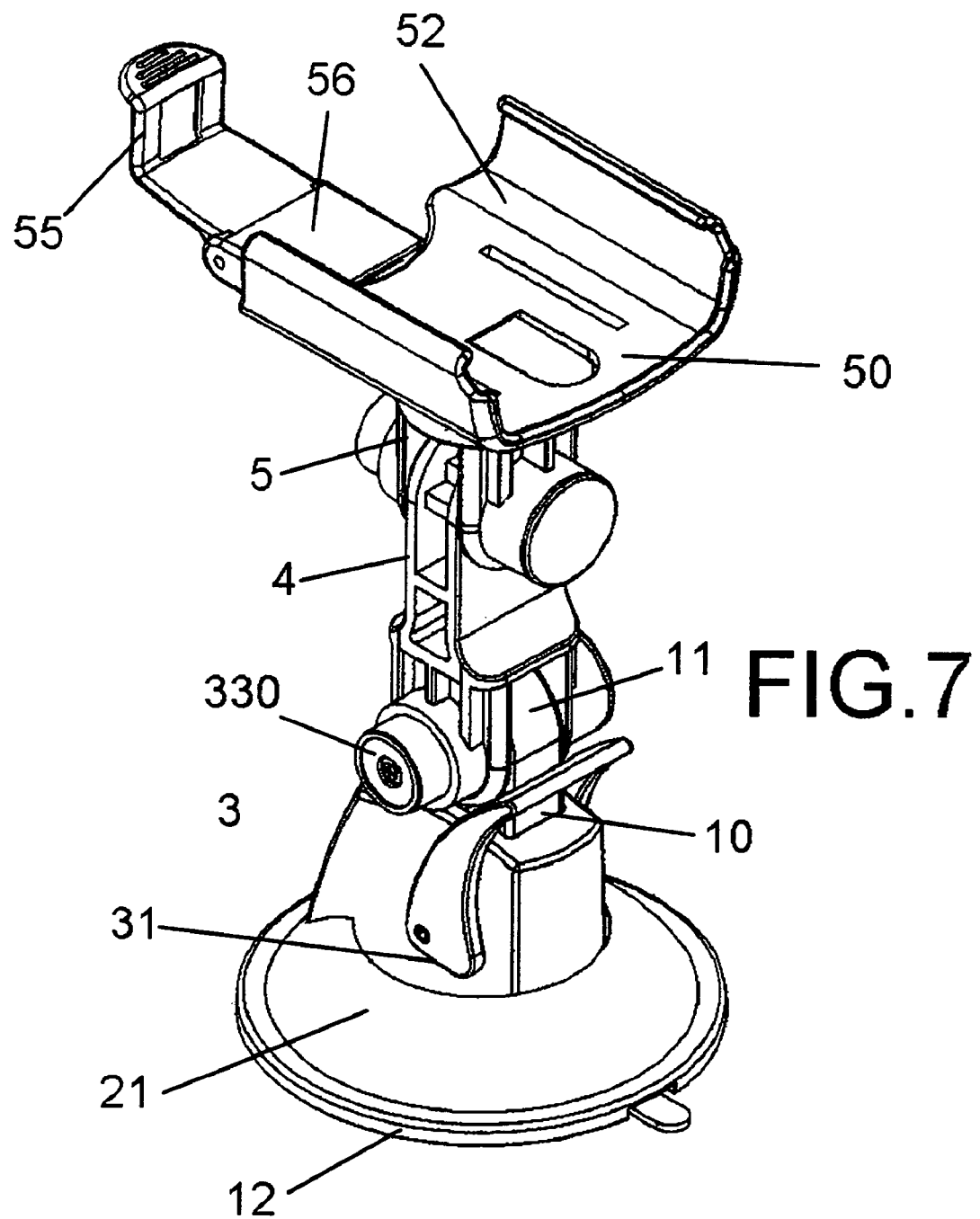
FIG. 7 is an elevational view of a vacuum mount type support device in accordance with a second embodiment of the present invention.
Figure 8:
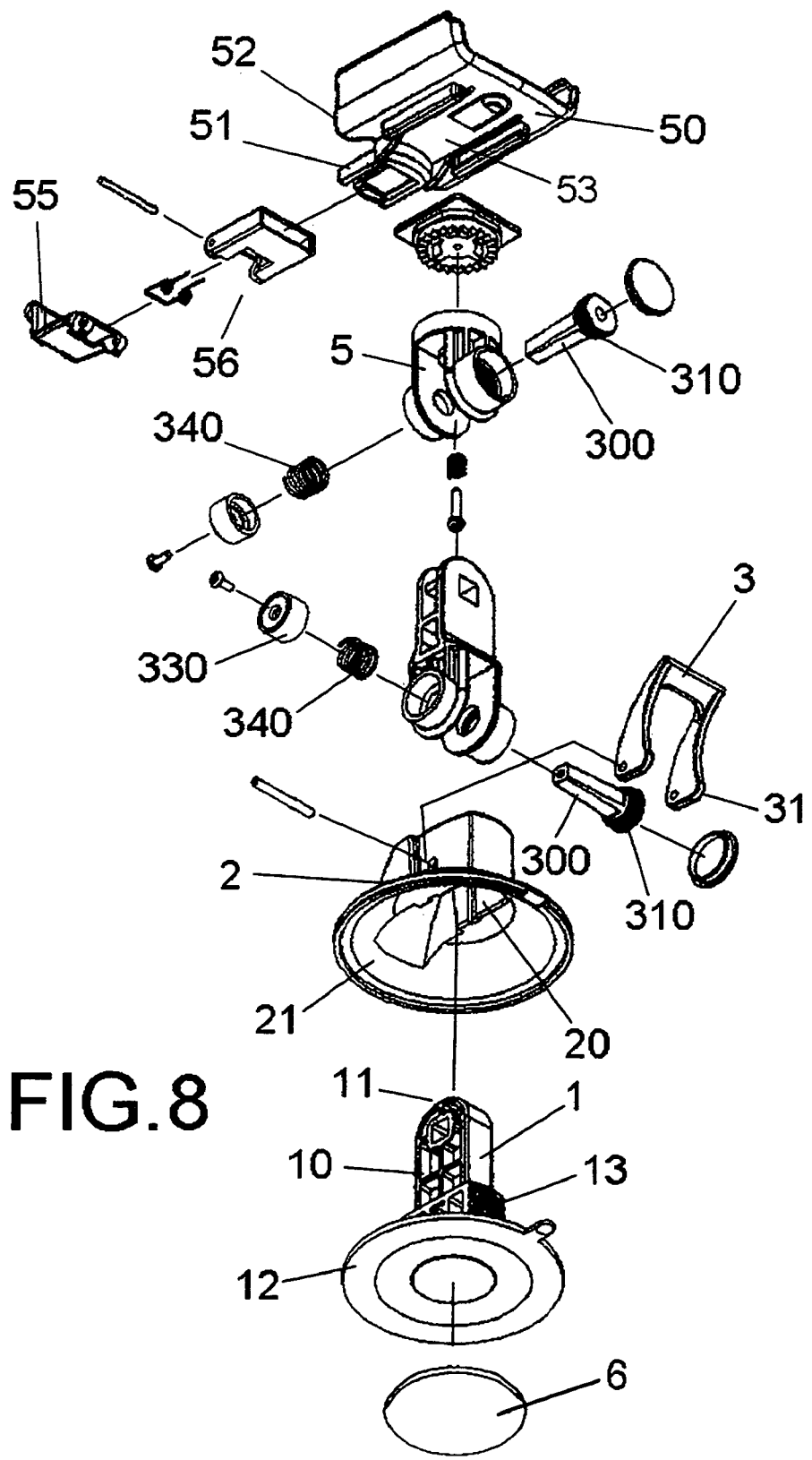
FIG. 8 is an exploded view of the vacuum mount type support device in accordance with the second embodiment of the present invention.
Figure 9:
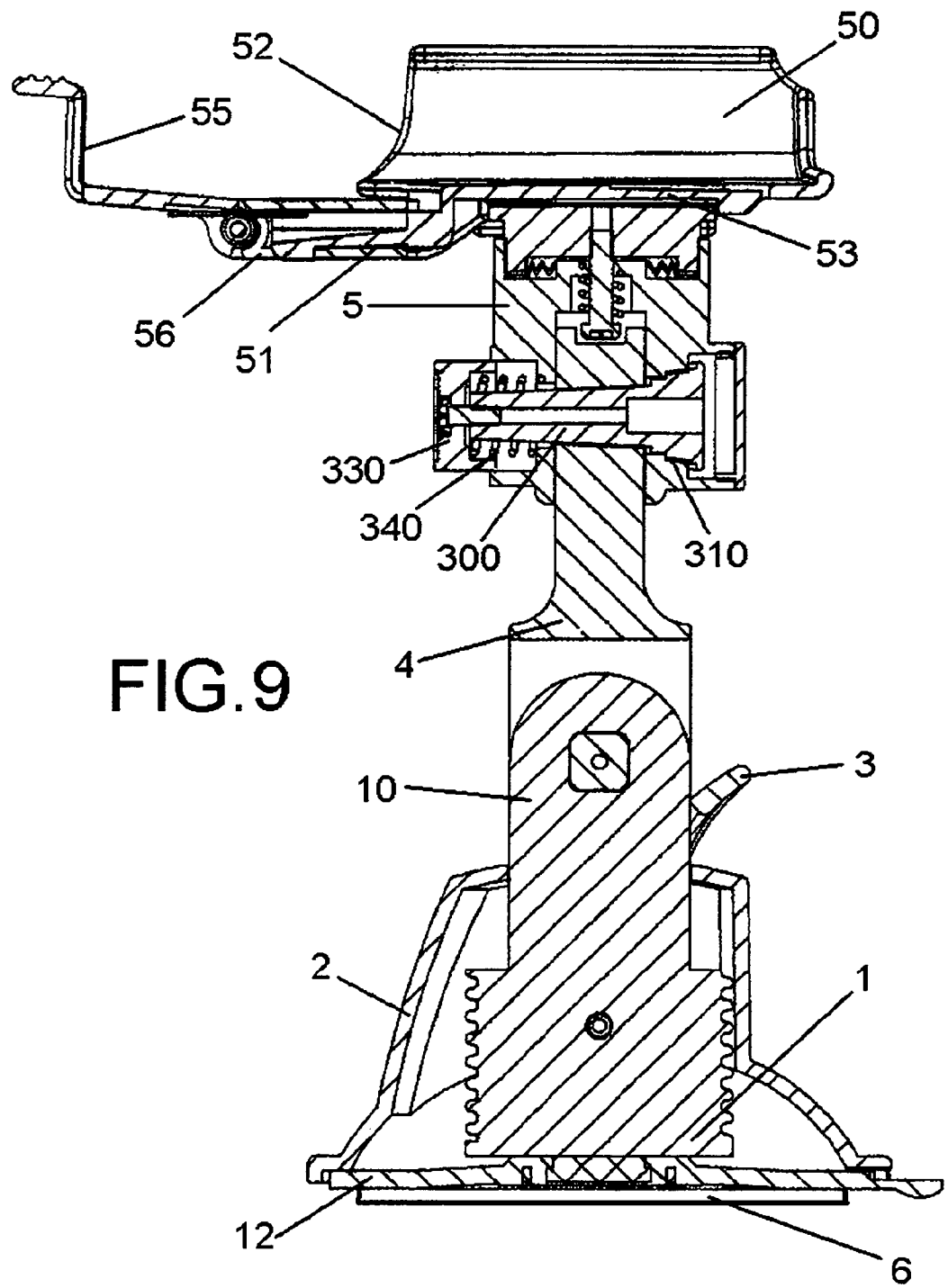
FIG. 9 is a sectional side view of the vacuum mount type support device in accordance with the second embodiment of the present invention.

FIGS. 7~9 show a vacuum mount type support device in accordance with a second embodiment of the present invention. This second embodiment is substantially similar to the aforesaid first embodiment with the exception of the structure of the control device 3. According to this second embodiment, the control device 3 is a lever having cam portions 31 pivoted to the vacuum mount cap member 2 and kept in close contact with the top surface of the cup-like body 21. When biasing the control device 3 in one direction after the rubber disk 12 is attached to a glass, the cam portions 31 are forced to impart a pressure to the cup-like body 21 against the rubber disk 12 to produce a vacuum. On the contrary, when biasing the control device 3 in the reversed direction, the applied pressure is released from the cup-like body 21, and therefore the vacuum disappears.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A vacuum mount type support device, comprising:
a vacuum mount base member, said vacuum mount base member comprising a multilateral upright shaft, and a rubber disk located on a bottom side of said multilateral upright shaft for attaching to a smooth surface for producing a vacuum suction force, said multilateral upright shaft having an outer thread extending around the periphery of a lower part thereof, and a connector located on a top end thereof; a first arm rotatably connected to said multilateral upright shaft, said first arm rotating about a first horizontal rotational axis formed by said connector of said multilateral upright shaft; a second arm rotatably connected to said first arm, said second arm rotating about a second horizontal rotational axis formed through connection of said second arm to said first arm; annular teeth rotatably connected to said second arm, said annular teeth rotating about a vertical axis formed through connection of said second arm to said annular teeth; a vacuum mount cap member made of a hard material, said vacuum mount cap member having a cup-like body capped on a top side of said rubber disk of said vacuum mount base member and a through hole cut through the center of said cup-like body for the passing of said multilateral upright shaft, said multilateral upright shaft extending both through and above said through hole to expose said connector located on the top end of said multilateral upright shaft; a control device sleeved onto said multilateral upright shaft and rotatably to impart a pressure to said vacuum mount cap member against said vacuum mount base member, said control device having an inner thread threaded onto the outer thread of said vacuum mount base member; a stop member fastened to said multilateral upright shaft to prohibit escape of said vacuum mount cap member from said multilateral upright shaft; and a device holder for holding an external device, a top of said annular teeth being connected to a bottom of said device holder.

2. The vacuum mount type support device as claimed in claim 1, wherein said rubber disk has a flat polyurethane pad bonded to a bottom side thereof.

3. The vacuum mount type support device as claimed in claim 1, wherein said device holder comprises a recessed holder base, a mounting portion located on a bottom side of said recessed holder base for mounting, an extension bar extended from one side of said recessed holder base, a shell fastened to said extension bar, and a clamping plate inserted into said shell and movable in and out of said shell between a received position and an extended position and biasable relative to said shell when extended out of said shell to the extended position.

4. A vacuum mount type support device, comprising: a vacuum mount base member, said vacuum mount base member comprising a multilateral upright shaft, and a rubber disk located on a bottom side of said multilateral upright shaft for attaching to a smooth surface for producing a vacuum suction force, said multilateral upright shaft having a connector located on a top end thereof; a first arm rotatably connected to said multilateral upright shaft, said first arm rotating about a first horizontal rotational axis formed by said connector of said multilateral upright shaft; a second arm rotatably connected to said first arm, said second arm rotating about a second horizontal rotational axis formed through connection of said second arm to said first arm; annular teeth rotatably connected to said second arm, said annular teeth rotating about a vertical axis formed through connection of said second arm to said annular teeth; a vacuum mount cap member made of a hard material, said vacuum mount cap member having a cup-like body capped on a top side of said rubber disk of said vacuum mount base member and a through hole cut through the center of said cup-like body for the passing of said multilateral upright shaft, said multilateral upright shaft extending both through and above said through hole to expose said connector located on the top end of said multilateral upright shaft; a control device pivotally connected to said vacuum mount cap member and biasable relative to said vacuum mount cap member to impart a pressure to said vacuum mount cap member against said vacuum mount base member, said control device having two cam portions kept in contact with a top surface of said vacuum mount cap member; a stop member fastened to said multilateral upright shaft to prohibit escape of said vacuum mount cap member from said multilateral upright shaft; and a device holder for holding an external device, a top of said annular teeth being connected to a bottom of said device holder.

5. The vacuum mount type support device as claimed in claim 4, wherein said rubber disk has a flat polyurethane pad bonded to a bottom side thereof.

6. The vacuum mount type support device as claimed in claim 4, wherein said device holder comprises a recessed holder base, a mounting portion located on a bottom side of said recessed holder base for mounting, an extension bar extended from one side of said recessed holder base, a shell fastened to said extension bar, and a clamping plate inserted into said shell and movable in and out of said shell between a received position and an extended position and biasable relative to said shell when extended out of said shell to the extended position.

* * * * *